(12) United States Patent  
Roming et al.

(10) Patent No.: US 8,715,808 B2
(45) Date of Patent: May 6, 2014

(54) METHOD FOR COUPLING STIFFENING PROFILE ELEMENTS AND STRUCTURAL COMPONENT

(75) Inventors: Thorsten Roming, Himmelpforten (DE); Thorsten Schroeer, Buxtehude (DE); Hauke Kirstein, Ellerau (DE); Hinnik Gensch, Hamburg (DE); Stefan Tacke, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 861 days.

(21) Appl. No.: 12/666,605

(22) PCT Filed: Jun. 19, 2008

(86) PCT No.: PCT/EP2008/057758
§ 371 (c)(1),
(2), (4) Date: Jun. 15, 2010

(87) PCT Pub. No.: WO2009/000734
PCT Pub. Date: Dec. 31, 2008

(65) Prior Publication Data
US 2010/0272954 A1    Oct. 28, 2010

Related U.S. Application Data

(60) Provisional application No. 60/937,063, filed on Jun. 25, 2007.

(30) Foreign Application Priority Data

Jun. 25, 2007    (DE) .................... 10 2007 029 500

(51) Int. Cl.
*B32B 3/06* (2006.01)
*B32B 3/10* (2006.01)
*B32B 3/24* (2006.01)
*B32B 3/28* (2006.01)
*B32B 5/12* (2006.01)
*B32B 7/08* (2006.01)
*B64C 1/06* (2006.01)
*B64F 5/00* (2006.01)

(52) U.S. Cl.
USPC ................ 428/136; 428/57; 428/58; 428/61; 428/77; 428/113; 428/114; 428/134; 428/137; 428/138; 428/178; 428/188; 428/189; 428/192; 428/213; 428/223; 244/131; 29/428

(58) Field of Classification Search
USPC ................ 52/846; 244/158.1, 118.1, 131
See application file for complete search history.

(56) References Cited

U.S. PATENT DOCUMENTS 1,743,327 A * 1/1930 Dornier .......................... 52/634
2,367,750 A * 1/1945 Berkow et al. ............. 244/123.2

(Continued)

FOREIGN PATENT DOCUMENTS

EP    1216816 A    6/2002
SU    967017 A1 * 10/1991

OTHER PUBLICATIONS

English Abstract of SU 967017 A1, Oct. 1991.*

*Primary Examiner* — Aaron Austin
*Assistant Examiner* — Jeff Vonch
(74) *Attorney, Agent, or Firm* — Maginot, Moore & Beck LLP

(57) ABSTRACT

This invention provides a coupling method for coupling a first and a second stiffening profile element for an outer skin of an aircraft or space craft. In a first step the stiffening profile elements are arranged on the outer skin in such a manner that the stiffening profile elements oppose each other with their respective front sides and enclose within themselves a cavity. Furthermore, a fixing hole is formed through a wall of at least one of the stiffening profile elements in the cavity inside a coupling zone of the stiffening profile element. An access opening is formed through the wall in the cavity along the coupling zone. A coupling strap, which couples the stiffening profile elements together, is fastened to the coupling zone by means of a fastening element guided through the fixing hole.

15 Claims, 3 Drawing Sheets

(56) References Cited

U.S. PATENT DOCUMENTS

| | | | |
|---|---|---|---|
| 2,379,352 A * | 6/1945 | Hardman | 244/124 |
| 2,382,358 A * | 8/1945 | Watter | 244/131 |
| 2,650,185 A | 8/1953 | Larson | |
| 2,945,653 A * | 7/1960 | Atkin | 244/119 |
| 4,828,202 A * | 5/1989 | Jacobs et al. | 244/117 R |
| 6,314,630 B1 | 11/2001 | Munk | |
| 6,601,349 B1 * | 8/2003 | Corden | 52/36.5 |
| 7,074,474 B2 * | 7/2006 | Toi et al. | 428/102 |
| 7,823,362 B2 * | 11/2010 | Meyer | 52/713 |
| 7,938,367 B2 * | 5/2011 | Jarsaillon et al. | 244/131 |
| 8,074,694 B2 * | 12/2011 | Brook et al. | 156/523 |
| 8,087,614 B2 * | 1/2012 | Childs | 244/123.8 |
| 8,302,909 B2 * | 11/2012 | Cazeneuve et al. | 244/120 |
| 8,371,529 B2 * | 2/2013 | Tacke et al. | 244/119 |
| 8,480,031 B2 * | 7/2013 | Gauthie et al. | 244/120 |
| 2006/0060705 A1 * | 3/2006 | Stulc et al. | 244/119 |
| 2013/0181092 A1 * | 7/2013 | Cacciaguerra et al. | 244/131 |

* cited by examiner

METHOD FOR COUPLING STIFFENING PROFILE ELEMENTS AND STRUCTURAL COMPONENT

CROSS-REFERENCE TO RELATED APPLICATIONS

This application claims the benefit of U.S. Provisional Application No. 60/937,063, filed Jun. 25, 2007 and German Patent Application No. 10 2007 029 500.8, filed Jun. 25, 2007, the entire disclosures of which are herein incorporated by reference.

FIELD OF THE INVENTION

This invention relates to a coupling method for coupling of stiffening profile elements, in particular for stiffening an outer skin of an aircraft or spacecraft. The invention also relates to a structural component with coupled stiffening profile elements.

Although applicable to any stiffening profile elements with cavities or undercut, this invention and the problems on which it is based are explained in further detail with regard to stringers with an Ω-profile which stiffen an aircraft fuselage in the longitudinal direction.

Fuselage shells for aircraft are normally produced in so-called lightweight design from an outer skin which is reinforced on the inside by a two-dimensional structure of stringers running in the longitudinal direction of the aircraft and ribs running transversely to the longitudinal direction of the aircraft as stiffening elements. Here, it has proved appropriate to divide an aircraft fuselage into several approximately cylindrical sections or sections in the shape of a truncated cone which are previously assembled and are joined together in a subsequent operating step to form an aircraft fuselage. So-called transverse joint connections are formed at the seam points between the individual sections, which couple the outer skin panels of adjacent sections and stringers running beyond the section boundaries in such a manner that the stability of the aircraft fuselage is guaranteed beyond the section boundaries.

In order to connect outer skin panels, for example, they are allowed to abut each other on a section boundary and they are connected by a so-called transverse butt strap, a bent plate of a thickness comparable to that of the outer skin, which is arranged on the inside of the outer skin flush to the outer skin panels so that it runs beyond the section boundary, and is connected to them by riveting, for example.

Similarly, stringers which are designed conventionally as profiled parts with a Z- or T-profile, are coupled by suitably adapted transverse butt straps. For example, transverse butt straps with a two-leg, L-shaped profile are arranged to run beyond the section boundary on the abutting stringers so that one of the legs of the profile lies flush against the profile feet of the stringers to be coupled and the other leg lies flush against the vertically running profile web of the Z- or T-profile. Both legs are then connected to the stringers, e.g. with conventional rivet or bolt joints. Here, the leg resting on the profile foot of the stringers is secured by rivets which pass through the transverse butt strap, the profile foot and the outer skin, whilst the leg resting on the vertical profile web of the stringers is fastened with rivets which only pass through the transverse butt strap and the profile web of the stringers.

Aluminium and aluminium alloys have been used for decades as conventional materials for the outer skin, stringers and ribs. However, they are being increasingly replaced by composite fibre materials, in particular by carbon fibre reinforced plastic (CFRP), which allows a considerable weight saving. In this case, however, design methods and structures have to be modified in many cases in order to conform to the properties of the composite fibre materials that deviate considerably from conventional aluminium materials.

For example, it has proved suitable, in the case of aircraft fuselages produced from CFRP, to use stringers with a so-called Ω-profile instead of stringers with a Z- or T-profile, i.e. with a profile which has two profile feet resting on the outer skin and a bulge arranged between them, which bulge encloses a cavity with the section of the outer skin lying between the profile feet.

Since this cavity is not easily accessible from outside the stringer, the problem arises, when coupling such stringers, that riveted joints between one flank of the Ω-profile and a transverse butt strap arranged flush to it, on the side of the stringer, projects into the inaccessible cavity, from where it cannot be examined for quality control. One further problem lies in the fact that when drilling fixing holes in the flanks of the stringer, chips fall into the cavity which can no longer be removed from it. Even if these holes were to be drilled from the accessible outside of the stringer to repair damaged riveted joints, parts of the damaged riveted joints would necessarily fall into the inaccessible cavity, where they would roll around during flight, causing noises and damage.

SUMMARY OF THE INVENTION

It is therefore an object of this invention to provide an improved coupling for stiffening profile elements which, when assembled, include an inaccessible cavity, which coupling does not load the cavity with waste materials and allows a reliable quality control to be carried out.

This object is achieved according to the invention by a coupling method with the features of claim 1, and by a structural component with the features of claim 7.

The idea on which this invention is to provide a first stiffening profile element which, when arranged on the outer skin to be stiffened, includes a cavity for coupling to a second stiffening profile element in a coupling zone with an access opening which renders the cavity accessible in the coupling zone, thereby enabling mechanical operations or quality control measures to be carried out, for example. At least one fixing hole is formed along the access opening within the coupling zone. A coupling strap, which couples the stiffening profile elements to each other, is fastened by means of a fastening element guided through the fixing hole to the coupling zone of the first stiffening profile element.

This invention allows the quality of the fixing hole to be examined by simple means not only from the outside of the stiffening profile element but also through the access opening from the inside facing the cavity. After the fastening element, e.g. a rivet or bolt, is fitted, the part projecting into the cavity can also easily be inspected from the side of the cavity. The invention therefore enables a constant, high quality standard to be maintained at low cost when coupling the stiffening profile elements.

The access opening into the cavity according to the invention also enables mechanical operations to be carried out in the cavity at low cost. For example, screw nuts and/or tools can be provided from the side of the cavity to the fixing hole, thus providing many different possibilities of designing the fastening element. For example, the fastening element may be designed in the form of screw bolts and can therefore be detached quickly and easily for repair work. If a part of the fastening element falls into the cavity during repair work, e.g.

when replacing the fastening element, it can easily be removed from it through the access opening.

Advantageous embodiments and improvements of the invention are described in the dependent claims.

According to a preferred embodiment, the forming of the fixing hole, the forming of the access opening and the fastening of the coupling strap all take place on the first and second stiffening profile elements. This therefore provides the advantages mentioned both in terms of the first and in terms of the second stiffening profile element.

According to a preferred embodiment, the fixing hole is formed by machining. Furthermore, a step of removing chips from the cavity is provided through the access opening. The advantage of this is that the flying weight of the aircraft is reduced.

According to a preferred embodiment, a step of reinforcing the wall of the stiffening profile element is provided in the coupling zone. This enables mechanical weakening of the stiffening profile element to be compensated for in the coupling zone so that the coupled stiffening elements have a constant mechanical strength between them via the seam point.

Here, the stiffening profile element is preferably designed as a composite fibre component, the wall being reinforced by laminating on at least one additional layer of fibres. In addition to a fixed connection to the remaining layers of fibres, this also enables the fibre direction of the additional layer of fibres to be adapted to the shape and position of the access opening, thus increasing stability.

The coupling method according to the invention is advantageously suitable for connecting sections of an aircraft fuselage, since it enables sections to be connected to each other in a simple manner and well suited for maintenance to achieve a high quality standard.

According to a preferred embodiment of the structural component according to the invention, a first and second fixing hole are formed in the respective coupling zones of the first and second stiffening profile elements. An access opening is formed in each coupling zone of the first and second stiffening profile elements. The coupling strap is fastened to the first stiffening profile element by means of a fastening element guided through the first fixing hole, and is fastened to the second stiffening profile element by means of a fastening element guided through the second fixing hole. Therefore, the fastening elements used on both stiffening profile elements can be easily repaired and easily inspected for quality control.

According to a preferred embodiment, the access opening is designed as a slot running in the longitudinal direction of the stiffening profile element. For example, the end of the fastening element projecting into the cavity can in this way be inspected from a plurality of spatial directions. A row of fastening elements, all of which are also accessible from the side of the cavity, can be provided along the slotted access opening. The slot preferably opens into the front side of the stiffening profile element, which further improves the accessibility of fastening elements arranged in the vicinity of the front side of the stiffening profile element.

According to a preferred embodiment, a first and a second coupling strap are fastened on both sides of the access opening by means of fastening elements guided through fixing holes in the wall. The double coupling straps allow very stable coupling.

According to a preferred embodiment, the access opening is designed so that essentially the entire cavity is accessible in the coupling zone with one human hand inserted through the access opening. This enables maintenance engineers, for example, to remove chips, nuts, rivet residues etc. from the cavity without special tools or gripping devices.

According to a preferred embodiment, the access opening is designed so that the opening of the fixing hole into the cavity can be inspected from outside the cavity through the access opening. For example, this enables maintenance engineers to inspect the fixing holes and fastening elements without special mirrors, cameras or similar devices from the cavity for quality control.

According to a preferred embodiment, the stiffening profile element has a $\Omega$-profile, which provides a low weight of the structural component under given required stability conditions, particularly in the case of stiffening profile elements of composite fibre materials.

According to a preferred embodiment, the coupling strap has a two-leg profile, a first leg being fastened to the outer skin through a foot section of the $\Omega$-profile, and a second leg being fastened to a flank section of the $\Omega$-profile by means of the fastening elements. This is advantageous because the L-profile of the coupling strap reinforces the angle formed between the foot section and the flank section of the $\Omega$-profile and therefore compensates for a relative weakening of the $\Omega$-profile itself by the access opening in the coupling zone.

According to a preferred embodiment, the wall of the stiffening profile element in the coupling zone has a greater thickness than outside the coupling zone, thus enabling a relative weakening of the stiffening profile element by the access opening in the coupling zone to be compensated for. In the case of a stiffening profile element designed as a composite fibre component, an additional layer of fibres is preferably laminated on in the coupling zone, and is therefore connected very firmly to the underlying layers. Furthermore, the additional layer of fibres preferably has a fibre direction which runs diagonally outwards in the direction of the front face of the stiffening profile element. Because of this arranging the fibres enable loads of the stiffening element in the region of the coupling zone to be guided past the access opening.

The invention is explained in further detail in the following on the basis of exemplary embodiments with reference to the attached figures of the drawing.

BRIEF DESCRIPTION OF THE DRAWINGS

In the figures.

In the figures the same reference numbers denote the same or functionally similar components, unless otherwise indicated.

DESCRIPTION OF EXEMPLARY EMBODIMENTS

Figure 1:
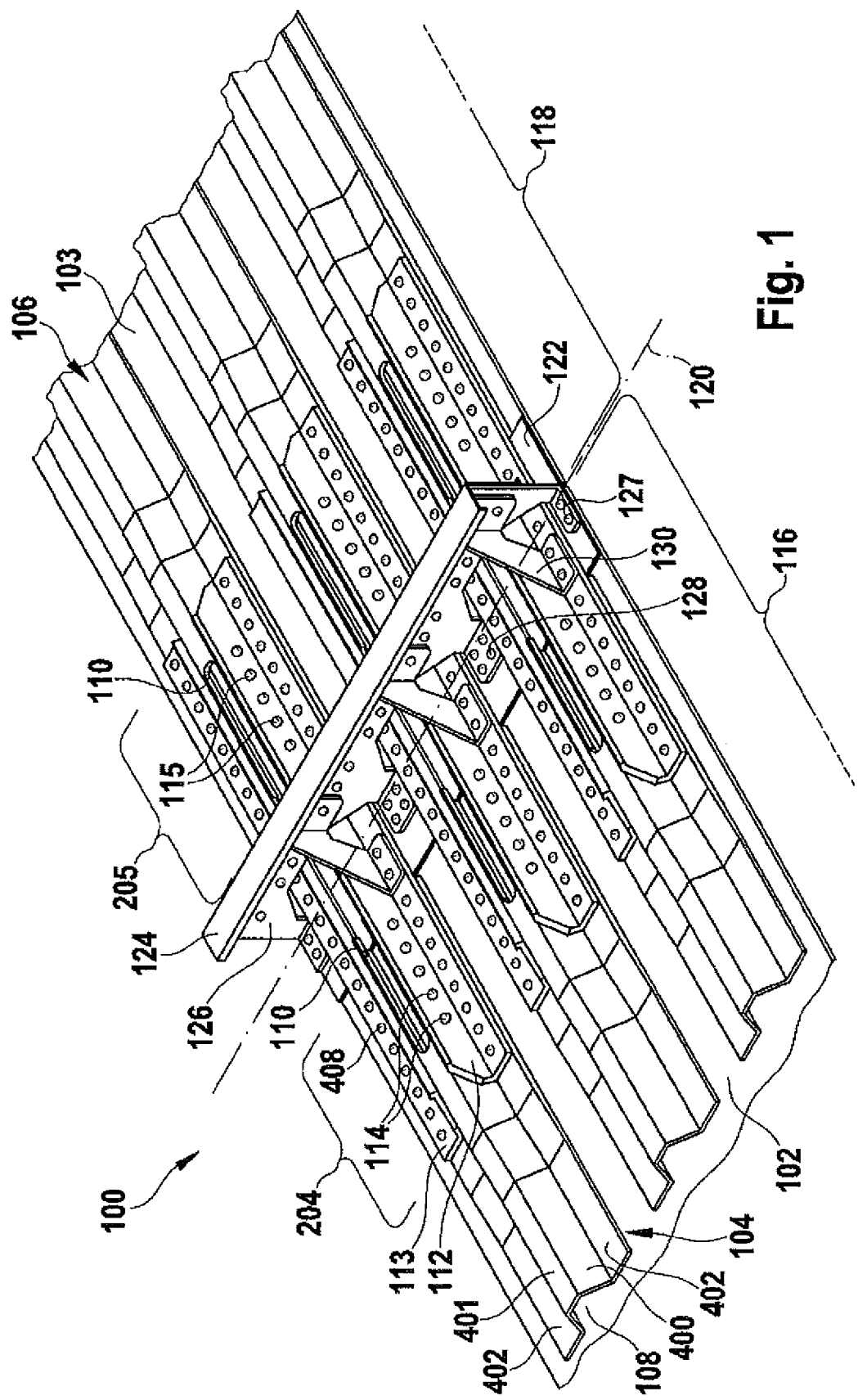
FIG. 1 shows a perspective view of a structural component with coupled stiffening profile elements according to an embodiment of the invention.

FIG. 1 shows in a perspective view, and sectionally, a structural component 100, which forms part of the fuselage shell of an aircraft, one's vision being directed to the inside of outer skin 102, 103 of the aircraft. The fuselage shell is joined together from a plurality of sections 116, 118 along seam lines 120 running annularly around the aircraft fuselage. The section shown in FIG. 1 comprises a part of a first 116 and a second 118 section whose seam point is denoted by the dash-dot line 120.

The first section 116 comprises a first further section 102, and second section 118 comprises a second further section 103 of outer skin 102, 103. Both outer skin sections abut each other along seam line 120, so that no step is formed on the smooth outside of the aircraft fuselage facing away from the observer. A butt strap 122 is arranged in a flush manner half on the first 102 and half on the second 103 section of outer skin 102, 103, on the inside of outer skin 102, 103 facing the observer, and is connected to both sections, e.g. by riveting.

The first 102 and second 103 section of outer skin 102, 103 connected by butt strap 122 are each individually stiffened by stiffening profile elements 104, 106 designed as stringers 104, 106, which elements run approximately parallel to the direction of flying and approximately perpendicularly to seam line 120 between sections 116, 118. Stringers 104, 106 have a Ω-shaped profile with a roof section 401, on both sides of which a flank section 400 falls, to which section a foot section 402 is connected. Stringers 104, 106 are each fastened to their foot sections 402 on the outer skin, so that they each enclose a cavity 108 with an approximately trapezoidal cross-section under their roof 401 and flank sections 400 with the section of outer skin 102, 103 lying between the foot sections.

In the vicinity of the seam line 120, stringers 104, 106, which are to run in the direction of seam line 120, terminate on the edges of butt strap 122, so that in the region of butt strap 122, the outer skin is not reinforced directly by stringers 104, 106. On both sides of butt strap 122 one pair of a first stringer 104 lie on the first section 102 of outer skin 102, 103 and of a second stringer 106 lying on the second section 103 of outer skin 102, 103, oppose each other with their front sides. both stringers 104, 106 of an opposing pair comprising a first 104 and second 106 stringer are each coupled by two coupling straps 112, 113.

Coupling straps 112, 113 have a two-leg, approximately L-shaped profile, the angle between the legs corresponding to the angle formed between foot section 402 and flank section 400 of the Ω-stringer 104, 106. Both coupling straps 112, 113, which each couple a pair of opposing stringers 104, 106, are arranged in mirror image fashion to each other on both sides of roof sections 401 on foot 402 and flank sections 400 of Ω-stringers 104, 106, the legs of coupling straps 112, 113 nestling against foot 402 and flank sections 400 because of the correspondence of the angles. Each coupling strap 112, 113 lies along the length of a coupling zone 204 of first stringer 104 on its end on first stringer 104 facing the second stringer 106, runs in the region between stringers 104, 106 via transverse butt strap 122, and lies along the length of a coupling zone 205 of second stringer 106 on this end facing first stringer 104 on second stringer 106.

The legs of coupling straps 112, 113 bearing against foot sections 402 of stringers 104, 106 are fastened to foot sections 402 and underlying outer skin sections 102, 103 by means of profile foot fasteners 408, e.g. by means of rivet bolts which are guided through a coupling strap 112, 113, a stringer 104, 106 and an outer skin section 102, 103. Both ends of profile foot fastener 408 are each accessible from the inside and outside of the aircraft and can therefore be subjected to a visual inspection, for example.

The legs of coupling straps 112, 113 bearing against flank sections 400 of the first 104 and second 106 stringer are fastened by means of a first row of fastening elements 114 in coupling zone 204 of first stringer 104 and in coupling zone 205 of second stringer 105 of second stringer 105 with second row of fastening elements 115, for example rivets or bolds.

Therein, fastening elements 114, 115 are respectively guided by means of coupling strap 112, 113 and flank section 400 of stringer 104 such that fastening elements 114, 115 extend with one and into the cavity 108.

In the roof sections 401 of stringers 104, 106 is formed, in the region of coupling zones 204, 205, a slotted access opening 110 which opens up access into cavity 108. Since access opening 110 runs between and parallel to the rows of fastening elements 114, 115 arranged in flank sections 400 on both sides of the stringer, the ends of fastening elements 114, 115 projecting into cavity 108 are accessible through the access opening, e.g. for a visual inspection for quality assurance.

A rib 124 is fastened at seam line 120 between the two outer skin sections 102, 103 as a further stiffening element by means of a shear comb 126 on transverse butt strap 122. Here, shear comb fasteners, e.g. rivet bolts, are guided through shear comb feet 127, transverse butt strap 122 and the underlying first outer skin section 102. Rib 124 is additionally supported by rib supports 130 on one 112 of coupling straps 112, 113 coupling a pair of stringers 104, 106.

Before sections 116, 118 are joined together for assembling the aircraft fuselage, transverse butt strap 122, shear comb 126 and rib 124 may be pre-assembled as parts of first section 116. In this case section 116 comprises the pre-assembled transverse butt strap 122, shear comb 126 and rib 125. In the section assembly, i.e. when joining sections 116, 118 together, the sections are positioned relative to each other, the part of transverse butt strap 12 projecting from the first outer skin section 102 coming to rest on the inside of second outer skin section 103 and being connected to it. Coupling straps 112, 113 are then assembled, followed by rib supports 130.

Figure 2A:
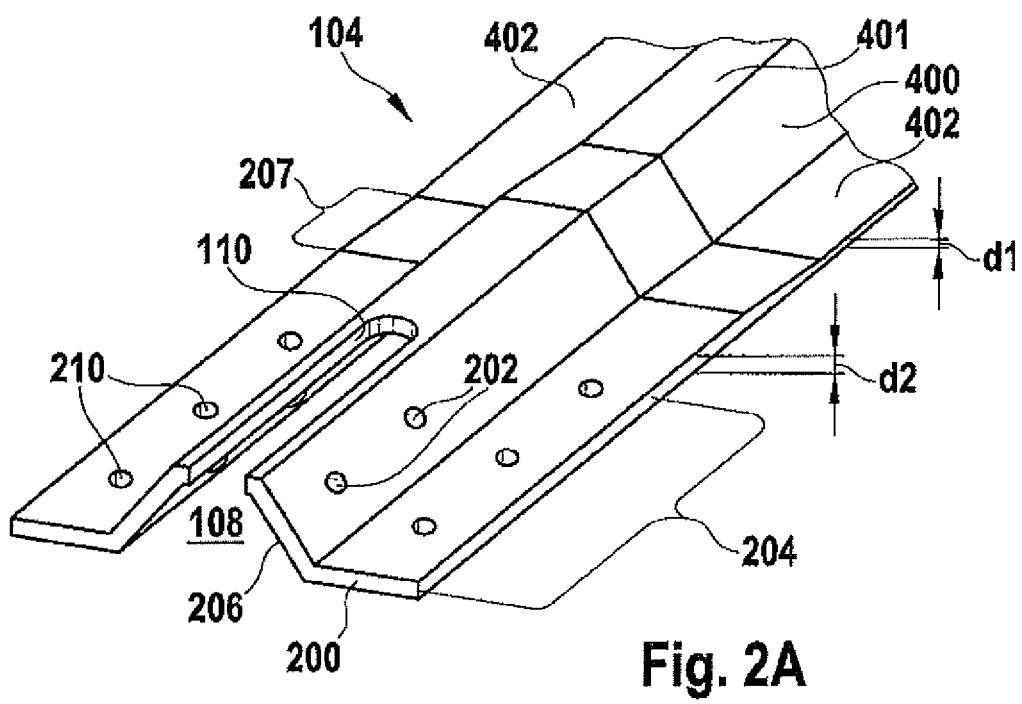
FIG. 2A shows a perspective view of an end section of a stiffening profile element from FIG. 1.

FIG. 2A shows, in a perspective view, an end section of a Ω-stringers 104, how it forms part of the structural component from FIG. 1. The Ω-shaped profile of stringer 104 comprises five sections 402, 400, 401, 400, 402 of approximately the same width and wall thickness d1, namely a central roof section 401, which is flanked by two flank sections 400, to which a foot section 402 is in turn connected. A cavity 108 is formed underneath roof section 401 and the flank sections.

Front side 200 of the Ω-stringers 104 is shown in the foreground of the view. A slot 110, open towards the front side inside a coupling zone 204 in roof section 401, is formed as an access opening into cavity 108. Fixing holes 202 are formed in flank sections 400 in the region of coupling zone 204, wherein their opening into cavity 108 can be examined from the outside through slot 110 and can therefore be easily inspected. Profile foot fastener holes 210 are provided in foot sections 402 in the region of coupling zone 204.

Wall 206 of the Ω-stringers 104 is made thicker in the region of coupling zone 204 than outside coupling zone 204, thereby compensating for the weakening of stringer 104 due to slot 110 in the region of coupling zone 204. For example, thickness d2 of wall 206 inside coupling zone 204 is approximately 20% greater than thickness d1 outside coupling zone 204, the thickness gradually increasing from d1 to d2 in a transitional zone 207.

Figure 2B:
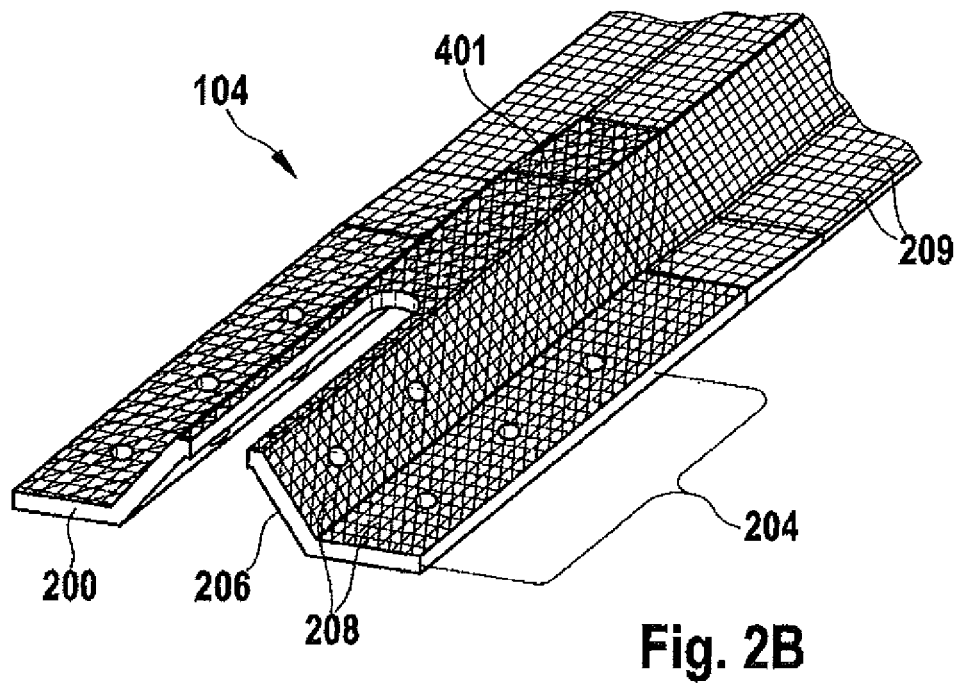
FIG. 2B shows a perspective view of an end section of a stiffening profile element from FIG. 1, with an illustrated fibre direction.

FIG. 2B shows, in the same perspective view as FIG. 2A, a possible embodiment of the Ω-stringer 104 from FIG. 2A. Stringer 104 is designed as a composite fibre component 104, e.g. from carbon fibre reinforced plastic. Inside the wall of stringer 104 fibre layers 104 run one above the other in strata parallel and transversely to the longitudinal direction of stringer 104. In the region of coupling zone 204 additional fibre layers 208 are laminated on, their fibre directions running diagonally outwards from roof section 401 in the direction of front side 200 on both sides. As a result of this the force flow is guided through roof section 401 of the stringer in coupling zone 204 past access opening 110 into the flank and foot sections of stringer 104.

Figure 3:
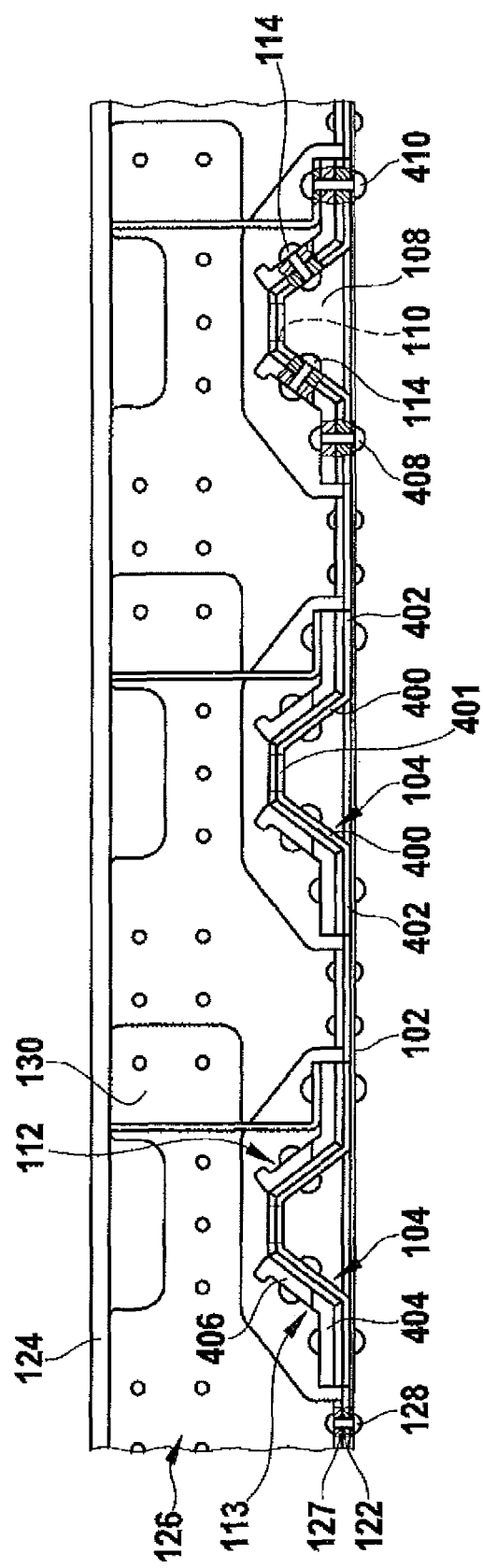
FIG. 3 shows a cross-sectional view of the structural component from FIG. 1.

FIG. 3 shows a cross-sectional view of the structural component from FIG. 1. Three Ω-stringers 104 running parallel are arranged on an outer skin 102 and between them runs transversal butt strap 122, also on outer skin 102. A shear comb 126 is fastened by means of rivet bolts 128 on transverse butt strap 122, which bolts are guided through foot 127 of shear comb 126, transverse butt strap 122 and outer skin 102. Thrust vane 126 supports rib 124.

On flank 400 and foot sections 402 of Ω-stringers 104 are arranged coupling straps 112, 113, whose profile has two legs 404, 406 at an angle of approx. 120° to each other, the same angle at which foot 402 and flank sections 400 of Ω-stringers 104 lie relative to each other. Legs 104 resting on foot section 402 of Ω-stringers 104 are fastened to them by rivet bolts 408, 410, each of which are guided through coupling strap 112, 113, Ω-stringer 104 and the outer skin. Some 410 of these rivet bolts 408, 410 are also guided through rib supports 130, which rest on coupling straps 112 and support rib 124.

Ω-stringers 104 enclose within them a cavity 108 which can be seen with the naked eye through a slot 110 in roof section 401 of Ω-stringers 104 and is made accessible to human hands. Legs 406 of coupling straps 112, 113, resting on flank sections 400 of Ω-stringers 104, are fastened to them by means of rivet bolts 114, which are guided through Ω-stringers 104 and coupling straps 112, 113. The ends of rivet bolts 114 projecting into cavity 108, can be seen through slot 110 during assembly, inspection and repair, and can be reached with naked hands and smaller tools.

Although this invention has been described here with reference to preferred exemplary embodiments, it is not limited to them but can be modified in several different ways.

For example, materials other than composite fibre materials can be used for outer skin, stiffening profile elements and/or coupling straps. The stiffening profile elements may have a fully closed profile, e.g. a rectangular profile. Instead of including a cavity, the stiffening profile may, for example, have undercuts or noses below which there are regions difficult to access for inspection and assembly.

LIST OF REFERENCE NUMERALS

100 Structural component
102, 103 Outer skin
104, 106 Stiffening profile element
108 Cavity
110 Access opening
112 Coupling strap
114, 115 Fastening element
116, 118 Section
120 Seam line
122 Butt strap
124 Rib
126 Shear comb
127 Shear comb foot
128 Shear comb foot fastener
130 Rib support
200 Front side
202 Fixing hole
204, 205 Coupling zone
206 Wall
207 Transitional zone
208 Diagonal fibre layer
209 Longitudinal fibre layer
210 Profile foot fastener hole
400 Flank section
401 Roof section
402 Foot section
404, 406 Profile leg
408 Profile foot fastener
410 Rib fastener

The invention claimed is:

1. A coupling method for coupling a first and a second stiffening profile element for an outer skin of an aircraft or spacecraft, with the steps:
    arranging of the stiffening profile elements on the outer skin so that the stiffening profile elements oppose each other with a respective front side, and each enclosing between a portion of itself and the outer skin a cavity;
    forming of a fixing hole by a wall of at least one of the stiffening profile elements into the cavity, within a coupling zone of the stiffening profile element;
    forming of an access opening into the cavity through the wall, along the coupling zone such that an opening of the fixing hole into the cavity can be seen from outside the cavity through the access opening;
        wherein the access opening is designed as a slot running in the longitudinal direction of a roof section of the stiffening profile element, which slot, opens into the front side of the stiffening profile element and extends along the coupling zone, and fastening a coupling strap, which couples together the stiffening profile elements, to the coupling zone by means of a fastening element guided through the fixing hole.

2. The coupling method according to claim 1, wherein the forming of the fixing hole the forming of the access opening and the fastening of the coupling strap take place on the first and on the second stiffening profile element.

3. The coupling method according to claim 1, wherein the forming of the fixing hole is carried out by machining, and further in that a step of removing of chips from the cavity is provided through the access opening.

4. The coupling method according to claim 1, wherein furthermore a step of reinforcing of the wall of the stiffening profile element is provided in the coupling zone.

5. The coupling method according to claim 4, wherein the stiffening profile element is designed as a composite fibre component and in that the reinforcing of the wall takes place by laminating on at least one additional layer of fibres.

6. The use of the coupling method according to claim 1 for connecting sections of an aircraft fuselage.

7. A structural component for an aircraft or spacecraft, with:
    an outer skin;
    a first and a second stiffening profile element which are arranged on the outer skin so that the stiffening profile elements oppose each other with a respective front side and each enclosing between a portion of itself and the outer skin a cavity;
    a fixing hole through a wall of at least one of the stiffening profile elements into the cavity, which is formed within a coupling zone of the stiffening profile element;
    an access opening into the cavity through the wall, which is formed along the coupling zone such that an opening of the fixing hole into the cavity can be seen from outside the cavity through the access opening, wherein the access opening is designed as a slot running in a longitudinal direction of a roof section of the stiffening profile element, which slot, opens into the front side of the stiffening profile element and extends along the coupling zone; and a coupling strap which couples the stiffening profile elements together and is fastened to the coupling zone by means of a fastening element guided through the fixing hole.

8. A structural component according to claim 7, wherein a first and second fixing hole are formed in a respective coupling zone of the first and second stiffening profile element;
the access opening is formed on the first and on the second stiffening profile element respectively; and
the coupling strap is fastened to the first stiffening profile element by means of a fastening element guided through the first fixing hole and to the second stiffening profile element by means of a fastening element guided through the second fixing hole.

9. The structural component according to claim 7, wherein a first and a second coupling strap are fastened on both sides of the access opening, each by means of fastening elements guided through fixing holes in the wall.

10. The structural component according to claim 7, wherein the access opening is designed so that essentially the entire cavity can be reached in the coupling zone with a human hand introduced through the access opening.

11. The structural component according to claim 7, wherein the stiffening profile element has an Ω-profile.

12. The structural component according to claim 11, wherein the coupling strap has a two-leg profile, wherein a first leg is fastened through a foot section of the Ω-profile to the outer skin, and wherein a second leg is fastened by means of the fastening elements to a flank section of the Ω-profile.

13. The structural component according to claim 7, wherein the wall of the stiffening profile element has a greater thickness in the coupling zone than outside of the coupling zone.

14. The structural component according to claim 13, wherein the stiffening profile element is designed as a composite fibre component, wherein an additional layer of fibres is laminated on in the coupling zone.

15. The structural component according to claim 14, wherein the additional layer of fibres has a fibre direction which runs diagonally outwards in the direction of a front face.

* * * * *